Figure 1:
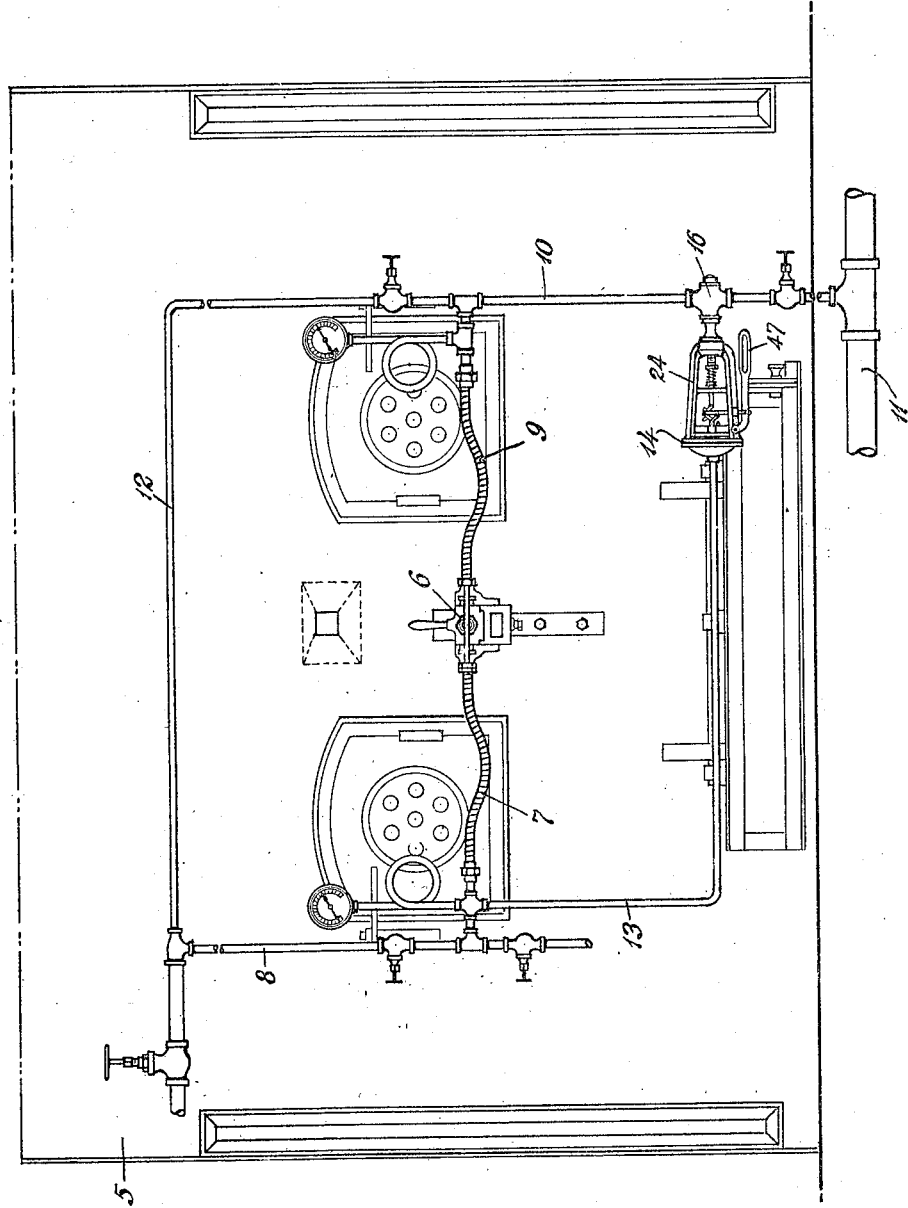

June 10, 1924.

H. A. KUNITZ

AUTOMATIC VALVE

Filed Sept. 8, 1923    2 Sheets-Sheet 1

1,496,990

WITNESS
G. V. Rasmussen

INVENTOR
HANNIBAL A. KUNITZ
BY
ATTORNEYS

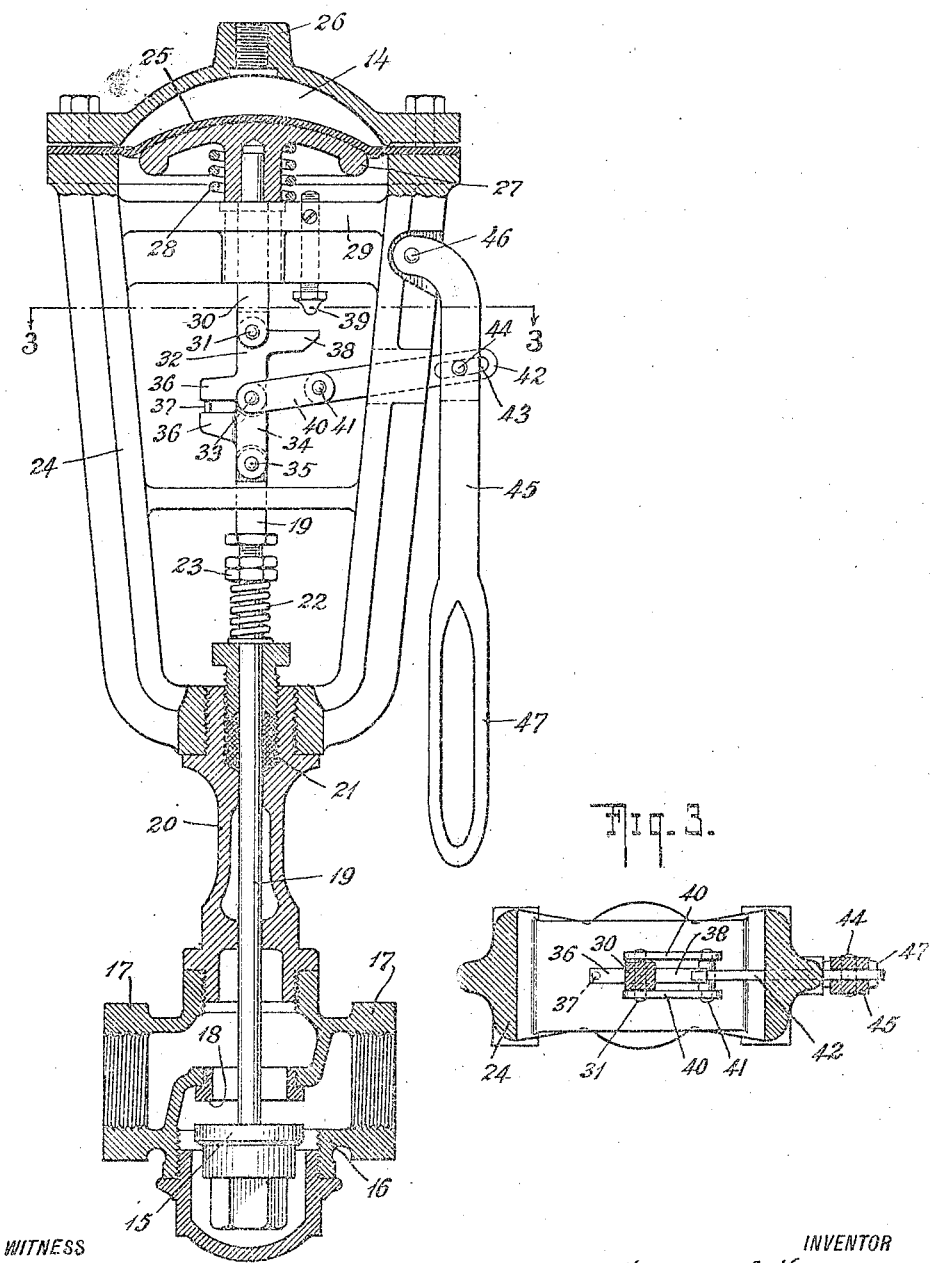

Patented June 10, 1924.

1,496,990

UNITED STATES PATENT OFFICE.

HANNIBAL A. KUNITZ, OF SPRINGFIELD, MASSACHUSETTS, ASSIGNOR TO CHARLES J. TAGLIABUE MFG. CO., OF BROOKLYN, NEW YORK, A CORPORATION OF NEW YORK.

AUTOMATIC VALVE.

Application filed September 8, 1923. Serial No. 661,717.

*To all whom it may concern:*

Be it known that I, HANNIBAL A. KUNITZ, born in Tunis of a German father and French mother and not positively knowing of what citizenship I am, but having formally declared my intention of becoming a citizen of the United States, in accordance with the United States naturalization laws, and having diligently prosecuted my application for United States citizenship to date, and now residing at Springfield, in the county of Hampden and State of Massachusetts, United States of America, have invented certain new and useful Improvements in Automatic Valves, of which the following is a specification.

My invention relates to automatic valves and has for its object to provide an automatically operating shut-off valve applicable to the fuel lines of oil burners and other devices where a safety valve is required, whereby the supply of fuel or other media to be controlled is automatically shut off under predetermined conditions. Other more specific objects will appear from the description hereinafter.

In the accompanying drawings which illustrate an example of the invention without defining its limits, Fig. 1 is a diagrammatic view of an oil burner installation including my improved valve; Fig. 2 is a sectional elevation on an enlarged scale showing said valve and Fig. 3 is a horizontal section on the line 3—3 of Fig. 2.

In the diagrammatically illustrated installation which has been chosen by way of example to illustrate the invention, 5 represents a boiler of any conventional construction in which steam is generated through the medium of an oil burner 6 of any well known type, said burner being connected by means of a tube 7 and piping 8 with a source of atomizing agent such as steam, air or the like. A tube 9 and piping 10 connects the burner with an oil supply pipe 11, it being understood that suitable valves are provided both in the steam line and in the oil line for manually controlling the same. The installation may further include a connection 12 from the steam line to the oil line for passing steam or other atomizing agent through the burner to clean the same when this is required. A connection 13 extends from the steam line to the diaphragm chamber 14 of my improved valve 15 which is located in the oil piping 10 as clearly shown in Fig. 1.

As shown in Fig. 2, the improved valve construction comprises a valve casing 16 having connections 17 whereby said casing may be incorporated in the piping 10 (in Fig. 1) and being provided with an interior seat 18 with which the valve disc 15 co-operates to control the flow of the oil or other media through the valve casing 16. The valve disc 15 is carried by a valve stem 19 slidably mounted in a guide 20 and stuffing box 21; a spring 22 surrounds the stem 19 at a point beyond the stuffing box 21 and bears with its one end against the latter and with its other end against tension adjusting nuts 23 mounted upon said stem; the spring 22 exerts a tension tending to move the valve disc 15 at all times toward its closed position. A spider or frame 24 is mounted upon the guide 20 and at its upper end carries a diaphragm 25 fixed in place by means of the diaphragm chamber 14, the latter having a tap 26 for the accommodation of the connection 13 (in Fig. 1). A diaphragm member 27 bears against the diaphragm 25 and is controlled by means of a coiled spring 28 which engages said member 27 with one end and with its other end bears against a cross bar 29 of the spider 24. The member 27 is connected with and carried by a bar 30 slidably guided in the cross piece 29 as shown in Fig. 2. The bar 30 is pivotally connected at 31 with a member 32 which, in turn, is pivotally connected at 33 with a second member 34; the latter, in turn, is pivotally connected at 35 with the one end of the valve stem 19, said members 32 and 34 constituting a toggle joint and being each provided with lugs 36, one of which carries a pin 37 adapted to bear against the other for arresting the pivotal movements of the toggle joint in one direction. The toggle member 32 is further provided with a lug 38 adapted, under certain conditions, to engage a trip stud 39, carried by the cross bar 29 for the purposes to be more clearly described further on. A link 40 is pivotally connected at 33 with the toggle connection and at 41 with a member 42 having a lengthwise extending slot 43. The latter is arranged to receive a pin 44 whereby said member 42 is pivotally and slidably connected with a trip setting lever 45. The latter is pivoted at 46 upon the spider 24 and for convenience of operation may be provided with an operating handle 47.

In the operation of the device in the installation illustrated in Fig. 1, in which steam is the atomizing agent, the pressure of said steam by way of the connection 13 and tap 26 and diaphragm chamber 14 upon the diaphragm 25, will maintain the parts in the position shown in Fig. 2 in which the valve disc 15 is open and the flow of oil to the burner 6 by way of the piping 10 and tube 9 from the supply pipe 11, is uninterrupted. Should the steam pressure fail or for any other reason become ineffective upon the diaphragm 25 so as to relieve the same of the pressure necessary to keep the valve disc 15 in its open position, the latter will automatically be moved to its closed position by the action of the springs 22 and 28. As this closing movement of the valve automatically takes place the lug 38 will be caused to engage the trip stud 39 which results in the toggle connection 32—34, being broken or, in other words, tripped to a position in which the rigid connection between the bar 30 and the valve stem is changed to a yielding connection. Even if the steam pressure is now again brought back to its normal point or the operative conditions of the installation are otherwise restored, any pressure on the diaphragm 25 will simply cause a movement of the member 27 and bar 30 against the tension of the spring 28 without, however, causing any movement in the valve disc 15 because of the broken or tripped condition of the toggle connection 32—34. To re-set the device and permit the valve disc 15 to be again opened by the action of the steam upon the diaphragm 25, the lever 45 is swung in a direction away from the spider 24 and thus exerts a pull upon the member 42 and link 40 which returns the toggle connection 32—34 to its said position indicated by solid lines in Fig. 2, this movement back to its operative position being arrested by the engagement of the pin 37 with one of the lugs 36. The slot 43 in the member 42 permits the latter to move relatively to the trip setting lever 45 to a sufficient extent to permit the breaking of the toggle connection in the manner set forth. In the arrangement described and set forth, once the mechanism has been tripped any action on the diaphragm 25 by the pressure of steam, air or other medium, will have absolutely no effect on the valve stem or valve proper and thus will not permit the fuel to be atomized from the burner until the automatic valve has been reset by hand after the conditions which were responsible for the failure of proper atomization of the oil or such other objectionable conditions as may have existed, have been rectified. The valve efficiently prevents at all times the admission of oil or other fuel through the burner in case of failure of steam, air or oil pressure for the proper atomization of the fuel oil. The valve is applicable to fuel lines of oil burner equipped boilers and other devices where a safety valve, intended to automatically operate in case of failure of oil, air or steam pressure during the period of operation, is required. The valve is automatic in shutting off the supply of fuel and must be manually re-set by hand; this guarantees that the operation of the burner will not be resumed until the conditions responsible for its failure have been corrected. The valve closes very quickly independently of any action of the diaphragm 25 and does not act in the direction of closing any slot in accordance with the gradual reduction of pressure upon said diaphragm as is the case with existing constructions. The toggle joint connection 32—34 protects the valve from any strains incident to a renewal of pressure upon said diaphragm 25 and thus prolongs the effective life of said valve to a maximum degree.

Various changes in the specific form shown and described may be made within the scope of the claims without departing from the nature of my invention.

I claim:

1. An automatic valve comprising a casing having an inlet and an outlet, a valve controlling the passage between said inlet and outlet, means tending to move said valve in one direction, means whereby said valve is arranged to be moved in the opposite direction, one of said means normally dominating the other to maintain said valve in one position and a normally rigid connection between said means adapted to be automatically changed to a yielding connection when said dominating means fails whereby said valve is maintained in another position which it automatically assumes because of the failure of said dominating means.

2. An automatic valve comprising a casing having an inlet and an outlet, a valve controlling the passage between said inlet and outlet, means tending to move said valve in one direction, means whereby said valve is arranged to be moved in the opposite direction, one of said means normally dominating the other to maintain said valve in one position, a connection between said means normally arranged to transmit the action of the dominating means to said valve and adapted to be tripped when said dominating means fails whereby said valve is maintained in another position which it automatically assumes because of the failure of said dominating means and means for manually restoring said connection to its operative position.

3. An automatic valve comprising a casing having an inlet and an outlet, a valve controlling the passage between said inlet and outlet, means tending to move said valve to its closed position, pressure operated means adapted to dominate said first means for maintaining said valve in its open position, a toggle-connection between said means normally arranged to transmit the action of said pressure operated means to said valve and adapted to be automatically tripped when said pressure operated means fails and said valve is automatically moved to its closed position and means for returning said toggle-connection to its operative position to restore the operative connection between said means.

4. An automatic valve comprising a casing having an inlet and an outlet, a valve controlling the passage between said inlet and outlet, closing means tending to move said valve to its closed position, pressure operated means adapted to dominate said first means for maintaining said valve in its open position, a toggle connection between said means adapted to be automatically tripped when said pressure operated means fails as said valve is moved to its closed position and a setting lever whereby said toggle connection may be manually returned to its operative position and the rigidity of the connection between said means is thereby restored.

5. An automatic valve comprising a casing having an inlet and an outlet, a valve in said casing controlling the passage between said inlet and outlet, a support mounted upon said casing, a valve stem carrying said valve and slidably mounted upon said support, a spring tending to adjust said valve to one of its positions, a pressure operated diaphragm normally dominating said spring to adjust said valve to a contrary position, a bar controlled by said diaphragm, a toggle connection between said bar and stem, means for tripping said toggle connection when said pressure operated diaphragm fails to dominate said spring and said valve is thereby automatically adjusted to said one of its positions and a setting lever for manually re-setting said toggle connection to restore the operative connection between said bar and stem.

6. The combination of an oil burner, a pipe line for an atomizing agent under pressure leading to said burner, an oil line leading to said burner, a valve in said oil line, means tending to move said valve to its closed position, pressure operated means normally dominating said first means to maintain said valve in an open position, a connection between said two means adapted to normally transmit the action of said pressure means to said valve and to be tripped when the pressure fails and said valve is automatically adjusted to its closed position to shut off the supply of oil to said burner and means whereby said connection is manually re-set when said pressure has been restored to return said valve to its open position.

7. The combination of an oil burner, a pipe line for an atomizing agent under pressure leading to said burner, an oil line leading to said burner, a valve in said oil line, a spring tending to adjust said valve to its closed position, a diaphragm, a connection between said line for the atomizing agent and said diaphragm whereby the latter is caused to dominate said spring and maintain said valve in its open position, a toggle connection between said valve and diaphragm, means for tripping said toggle connection when said pressure fails and the valve is thereby automatically adjusted to its closed position to shut off the supply of oil to said burner and a setting lever for manually re-setting said toggle connection to restore the operative connection between said diaphragm and valve whereby the latter is returned to its open position when said pressure is restored.

In testimony whereof I have hereunto set my hand.

HANNIBAL A. KUNITZ.